(12) United States Patent
Skjold

(10) Patent No.: US 9,109,659 B2
(45) Date of Patent: Aug. 18, 2015

(54) UNDERWATER SHACKLE

(71) Applicant: Lars Skjold, Kleeppestø (NO)

(72) Inventor: Lars Skjold, Kleeppestø (NO)

( * ) Notice: Subject to any disclaimer, the term of this patent is extended or adjusted under 35 U.S.C. 154(b) by 0 days.

(21) Appl. No.: 14/360,535

(22) PCT Filed: Nov. 16, 2012

(86) PCT No.: PCT/NO2012/050226
§ 371 (c)(1),
(2) Date: May 23, 2014

(87) PCT Pub. No.: WO2013/077740
PCT Pub. Date: May 30, 2013

(65) Prior Publication Data
US 2014/0333078 A1    Nov. 13, 2014

(30) Foreign Application Priority Data

Nov. 25, 2011  (NO) .................................. 20111635

(51) Int. Cl.
*F16G 15/06*    (2006.01)
*E21B 41/04*    (2006.01)
*B66C 1/66*     (2006.01)

(52) U.S. Cl.
CPC . *F16G 15/06* (2013.01); *B66C 1/66* (2013.01); *E21B 41/04* (2013.01)

(58) Field of Classification Search
USPC .............. 294/82.35, 66.1, 82.1, 82.11, 82.24, 294/82.3, 82.34
See application file for complete search history.

(56) References Cited

U.S. PATENT DOCUMENTS 3,066,970 A *  12/1962  Haake ........................ 294/82.25
3,628,821 A    12/1971  Reece
4,216,987 A *   8/1980  Ely ............................ 294/82.35

(Continued)

FOREIGN PATENT DOCUMENTS

| EP | 2159446 A2 | 3/2010 |
|---|---|---|
| EP | 2487103 A1 | 8/2012 |
| GB | 978682 A | 12/1964 |
| GB | 2301860 A | 12/1996 |
| WO | 9820257 A1 | 5/1998 |

OTHER PUBLICATIONS

International Search Report for PCT/NO2012/050226 mailed Jan. 31, 2013.

(Continued)

*Primary Examiner* — Paul T Chin
(74) *Attorney, Agent, or Firm* — Ben Schroeder Law

(57) ABSTRACT

An underwater shackle for heavy loads is described, comprising a shackle body (10) equipped with respective side plates (12a, 12b) and an upper, intermediate suspension (14) for connection to a lifting, strap, a lifting cable or the like, and also a lower locking bolt (20) for connection to the load. The locking bolt (20) is arranged to a hydraulically driven cylinder arrangement (30) so that it can move, where the cylinder arrangement (30) is placed adjoining one of the side plates (12a) and the cylinder arrangement (30) is arranged to be pressurized by a pressure medium to move the locking bolt (20) between a withdrawn position in the cylinder arrangement (30) and a locking position in the shackle body (10). A pressure distributor (40) is arranged with the cylinder arrangement (30) to receive and distribute the pressure medium, where the pressure distributor (40) comprises supply channels (44, 4) that run together with the first and the second inlet channels (34, 36) in the cylinder arrangement (30).

19 Claims, 2 Drawing Sheets

(56) References Cited

U.S. PATENT DOCUMENTS 4,264,098 A * 4/1981 Haake .................. 294/82.35
4,453,622 A * 6/1984 Betz ..................... 294/82.35
7,614,209 B1 * 11/2009 Payne et al. ............ 294/82.35
8,240,728 B2 * 8/2012 Hwang et al. ........... 294/82.35

OTHER PUBLICATIONS

Written Opinion for PCT/NO2012/050226 mailed Jan. 31, 2013.

* cited by examiner

UNDERWATER SHACKLE

This application claims priority under 35 USC §§365 and 371 to PCT/NO12/050226, filed Nov. 16, 2012, which in turn claims priority to NO20111635, filed Nov. 25, 2011, all of which are incorporated by reference in their entireties.

The present invention relates to an underwater shackle for heavy loads, comprising a shackle body equipped with a locking bolt for connection to the load and a cylinder arrangement for the operation of the locking bolt.

Standard shackles for underwater use are normally operated with the help of an ROV to open and close the shackle. In this context the shackle can have, for example, a locking bolt that must be driven into and out of the shackle, whereupon a suspension for the load is hung onto the locking bolt. To drive the locking bolt, mechanical systems or hydraulic systems can be used that use oil as a pressure medium. A disadvantage with hydraulic oil systems is that oil can leak out during use and also that such systems are often large and "lumpy".

With hydraulic systems the pressure supply part and the cylinder part with piston are normally placed after each other in the longitudinal direction, which leads to a relatively difficult shackle to handle. This is particularly relevant for large shackles that are used for heavy lifts under water.

Another disadvantage with the use of oil as a pressure medium is that some oil will always leak out during operation. Furthermore, it is difficult to connect a hydraulic hose under water, something which also increases the risk of oil spills. Furthermore, several hydraulic hoses must be used, at least one for the supply of oil and at least one for the return of the oil.

Today, there is a requirement of zero discharge of oil in connection with offshore oil and gas production. Consequently, it is an aim of the invention to provide a solution that meets this demand.

From the patent literature reference is made to, among others, U.S. Pat. No. 7,614,209 B1 which relates to a mechanical shackle device for heavy loads comprising a shackle body with side plates, an intermediate suspension for connection to a lifting strap and a lower locking bolt for connection of the load.

U.S. Pat. No. 3,628,821 A, WO2006055581 A, U.S. Pat. No. 5,580,113 A and NO325741 B1 show other embodiments of shackle devices for the lowering or lifting of loads from the ocean bed. The solutions describe the use of the surrounding pressure, ROV and electronic and mechanical release mechanisms for the locking bolt/pin.

A further object of the invention is to provide an underwater shackle that is simple to operate and which has relatively few mechanical components so that maintenance is simplified and the safety is attended to.

It is possible with the present invention to connect and disconnect with a considerably smaller and easier system than is possible with standard hydraulic systems.

Initially the present solution does not need valves and the like to open and close the shackle during operations and is therefore simpler. It shall not be ruled out that the solution can be equipped with valves, but then for a different purpose than in standard systems.

With heavy loads is meant underwater operation where loads of different types are lifted in connection with offshore operations and with a weight that can be up to and above 800 tonnes.

The above mentioned object are achieved with an underwater shackle for heavy loads comprising a shackle body equipped with respective side plates and an upper, intermediate suspension for connection to a lifting strap, a lifting cable or the like, and also a lower locking bolt for connection to the load. The locking bolt is arranged in a hydraulically driven cylinder arrangement so that it can move, where the cylinder arrangement is placed adjoining one of the side plates and where the cylinder arrangement is arranged to be pressurised by a pressure medium to move the locking bolt between a withdrawn position in the cylinder arrangement and a locking position in the shackle body. The cylinder arrangement comprises an inner cylinder boring where a piston part of the locking bolt is arranged for a longitudinal movement in the boring and a first inlet channel for the supply of the pressure medium to a first side of the piston part, arranged for outgoing movement of the locking bolt from the cylinder arrangement, and also a second inlet channel for the supply of the pressure medium to the other side of the piston part, arranged for ingoing movement of the locking bolt in the cylinder arrangement. A pressure distributor to receive and distribute the pressure medium, is arranged with the cylinder arrangement where the pressure distributor comprises supply channels that run together with said first and second inlet channels in the cylinder arrangement.

Alternative embodiments are given in respective dependent claims.

The pressure distributor can be arranged next to the cylinder arrangement. Furthermore, the pressure distributor can comprise a number of borings arranged to receive a mouthpiece for the supply of the pressure medium and where the supply channel ends up in said borings.

Said supply channels and said first and second inlet channels can be arranged to function as an inlet and an outlet for the pressure medium dependent on the direction of movement of the locking bolt.

The pressure distributor can comprise two borings arranged to receive the mouthpiece and supply of the pressure medium, respectively, to the first or the second side of the piston part of the locking bolt.

In a further embodiment the cylinder arrangement can comprise a spring-loaded locking peg arranged to lock the locking bolt securely when it is in the locking position in the shackle body.

The locking peg can be connected to, or integrated with, a locking plate that is arranged in the pressure distributor so that it can move, and where the mouthpiece is arranged to release the movement of the locking plate.

Furthermore, the locking plate can comprise respective openings that lie in associated borings in the pressure distributor and where a nose of the mouthpiece is arranged to be inserted into, or taken out of said openings, for the hoisting or lowering, respectively, of the locking plate.

In a further embodiment the cylinder arrangement can comprise a marker to show whether the locking bolt is in a withdrawn position in the cylinder arrangement or in a locked position in the shackle body, and the pressure distributor can comprise a marker to show whether the locking peg is in a locking position in the boring of the cylinder arrangement or in a extracted position.

The pressure medium can be water, such as the surrounding seawater.

Furthermore, the pressure medium can be supplied from an external high pressure source such as on board an ROV.

The invention shall now be explained in more detail with reference to the enclosed figures, in which.

Figure 1:
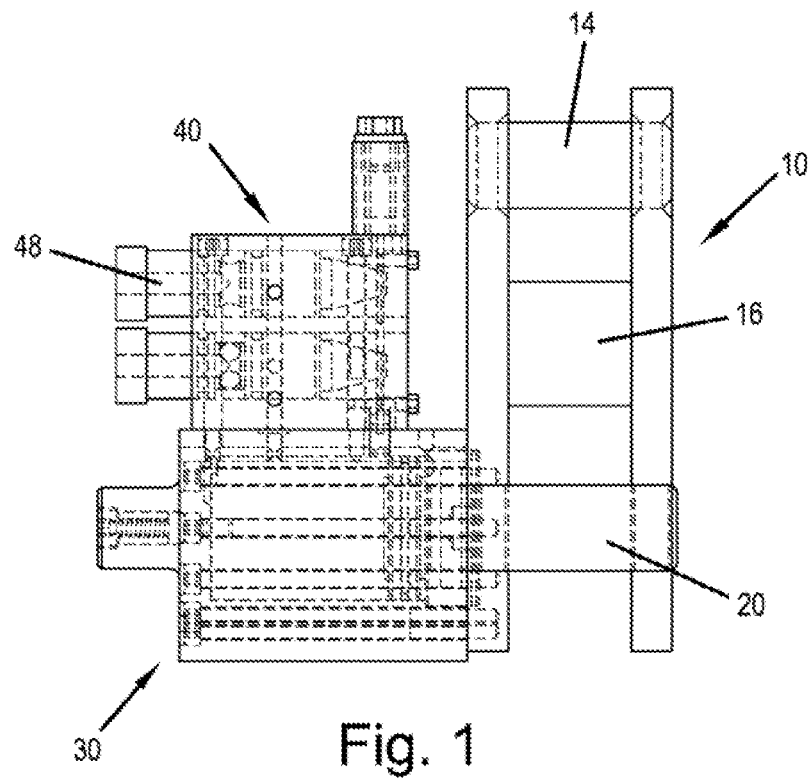
FIG. 1 shows a principle diagram of an underwater shackle according to the invention.
Figure 2:
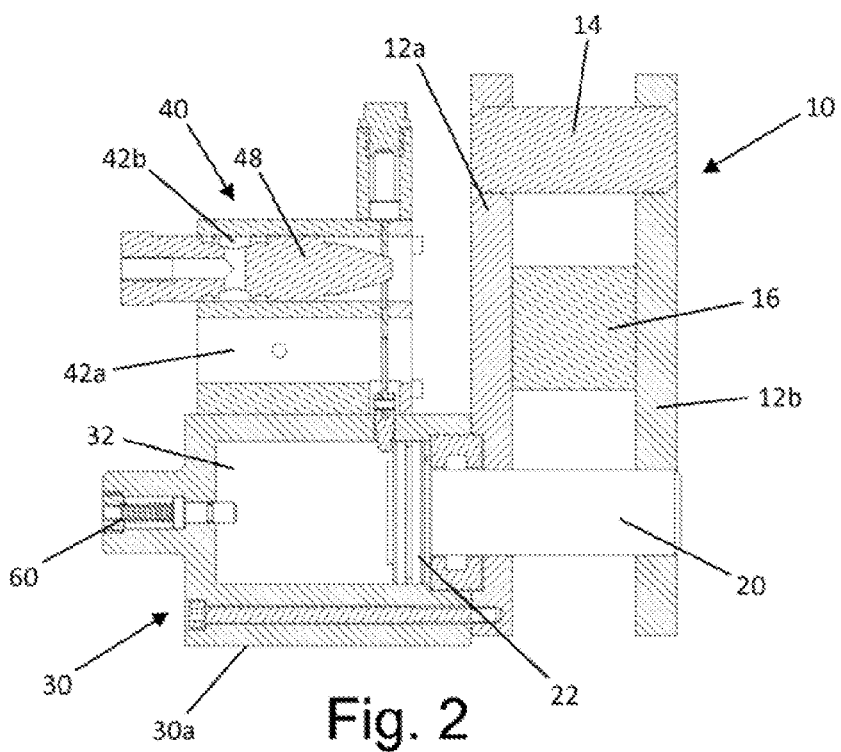
FIG. 2 shows a section of the shackle according to the invention.
Figure 3:
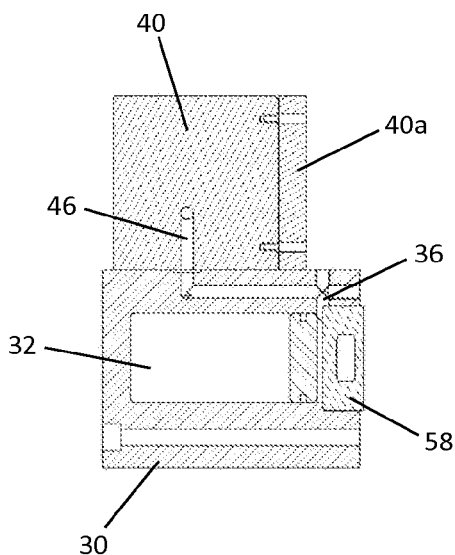
FIGS. 3 to 6 show different sections through a part of the cylinder arrangement and a pressure distributor according to the invention.

As the figures show, the invention relates to an underwater shackle comprising a shackle body 10 that in a standard, known way has two side plates 12a, 12b and that are held together by a suspension part 14 and possibly an intermediate support plate 16. A lifting strap, a cable or the like is fastened to the suspension 14 and which extends up to one or other lifting arrangement for the lifting of the heavy load. Furthermore, the shackle is equipped with a locking bolt 20 that can move and engage with, or be inserted into, an opening in one of the side plates 12b.

For a simple and safe movement of the locking bolt 20 the present shackle is equipped with a hydraulic system and which is preferably driven by water. This system comprises a cylinder arrangement 30 placed adjoining one of the side plates 12a, opposite to the side plate the locking bolt 20 engages with, and also a pressure distributor 40 for the supply of the pressure medium in the form of water, such as sea water. These two parts shall be explained in more detail in the following.

The supply of high pressure water is preferably carried out via a hydraulic hose (not shown) that is connected to an ROV with a high pressure aggregate. Initially, only one hydraulic hose is used. To supply water to the pressure distributor 40, the hydraulic hose is equipped with a mouthpiece 48 (hot stab) of a typical, known type, and which has outlet openings for water and which can be inserted into and locked in a receiver part.

The cylinder arrangement 30 according to the invention comprises a cylinder housing 30a equipped with an inner cylinder boring 32 where a piston part 22 of the locking bolt 20 can be moved in the longitudinal direction. The piston part 22 can be equipped with a gasket arranged in a circumferential groove 56. Similarly, the cylinder boring 32 can be equipped with a seal 58 at its "open" end. The locking bolt 20 is operated in a typical, known way in that a first side of the piston part 22 is pressurised so that the locking bolt 20 is driven out to engage with the opening of the other side plate 12b. Correspondingly, the other side of the piston part 22 is pressurised to drive the locking bolt 20 into the boring 32 again.

For the supply of pressure medium (for example, water), an inlet channel 34 ends up in a first part of the cylinder boring 32 and correspondingly, a second inlet channel 36 ends up in a second part of the cylinder boring 32 so that pressure medium is supplied to respective sides of the piston part 22.

The cylinder arrangement, in the main, can have a circular cylindrical shape and be fastened to the side plate 12a in a known way, for example, with bolts or be welded on. An upper part of the cylinder housing 30a is preferably formed with a flat section 30b for the fastening of the pressure distributor 40 so that the pressure distributor is placed side by side with the cylinder housing and extends in parallel in the same direction as the side plates 12a, 12b.

The pressure distributor 40 is corresponding to the cylinder housing 30a equipped with supply channels 44, 46, where the supply channels are connected to the inlet channels 34, 36 so that the pressure medium freely flows through. The cylinder arrangement 30 and the pressure distributor 40 can be formed and integrated into one piece, but for production purposes it is advantageous that they are two separate parts that are mounted together.

The supply channels 44, 46 end up in respective borings 42a, 42b in the pressure distributor 40. In a conceivable embodiment there can be just one boring, but there are preferably two borings. With the use of two borings, one boring 42a is used to supply water to drive out the locking bolt 20, while the other boring 42b is used to supply water to drive the locking bolt 20 into the cylinder 30 again. The two borings 42a, 42b in the pressure distributor can be placed above and underneath each other or they can be placed next to each other. In the FIGS. 1, 4 and 5 a mouthpiece 48 is shown in each boring 42a, 42b for purposes of illustration only, but since only one hydraulic hose preferably shall be used it is preferred that the same mouthpiece is used alternatively in both borings/connections. This is carried out by the ROV that pulls the mouthpiece out from a boring for locking of the shackle and places it in the second boring for the release of the shackle. When the locking bolt 20 is in the locked position the mouthpiece clearly does not need to be inserted.

The inlet channels 34, 36 and the supply channels 44, 46 will alternately function as an inlet or an outlet for the water, dependent on the drive direction of the locking bolt 20. As water is preferably used, it is of no significance that the water which is driven out goes to the surroundings. This would not be possible with an oil-based hydraulic system, as discharges of oil are not permitted.

When the locking bolt 20 is in the locked position, one side of the piston part 22 can be pressurised to hold the locking bolt in place. Alternatively, or in addition, the locking bolt 20 can be held in place by a spring-loaded locking peg 50 that lies against the piston part 22 and prevents the return of the locking bolt 20. The locking peg 50 is fastened to, or constitutes a part of, a locking plate 52 that is arranged in the pressure distributor 40.

Figure 4:
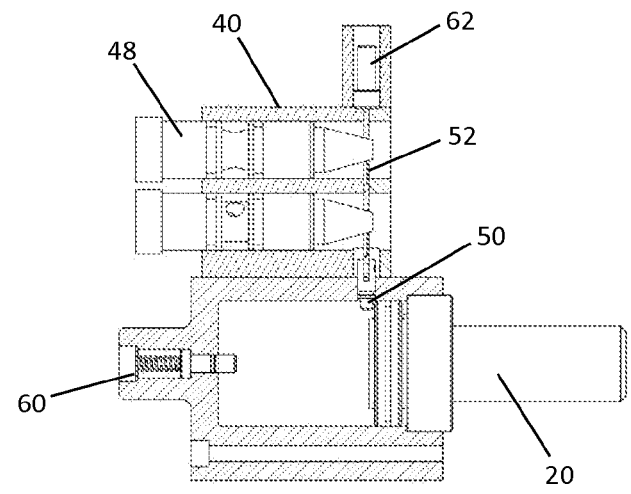
Figure 5:
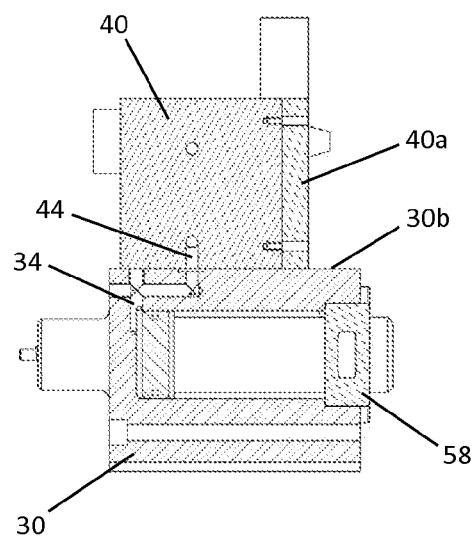
Figure 6:
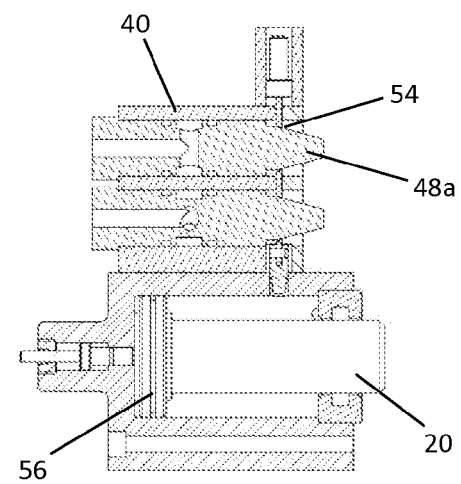

The locking plate 52 has respective openings 54, two openings when two borings 42a, 42b are used, which are placed eccentrically in the borings in the pressure distributor. So that when the mouthpiece 48 is led into one of the borings 42a (as shown in FIG. 4), the eccentric placing of the opening 54 contributes to the nose 48a of the mouthpiece forcing up the locking plate 52 and thus releasing the engagement of the locking peg 50 with the piston part 22 and this can move back again. At the same time water is supplied as described so that the locking bolt 20 is driven back. The corresponding happens by insertion of the mouthpiece in the second boring 42b that the locking plate 52 is lifted so that the piston part can freely move to its extreme position, and water to drive the locking bolt 20 out is supplied. To hold the locking plate 52 in place the pressure distributor 40 can be equipped with a cover 40a.

Furthermore, the cylinder arrangement 30 can be equipped with a marker 60 that shows whether the locking bolt 20 is driven in or not. The marker 60 can be, for example, a spring-loaded peg which the piston part 22 presses against when it is driven in, so that the peg is forced out of the cylinder housing for visual marking. The marker, i.e. the peg, can also be set up in a different way to send a signal, for example, by being connected to an electric device that can send a signal via a cabled or wireless connection to the surface or which provides a light marking. In the same way, the pressure distributor 40 can be equipped with a marker 62 that works according to the same principle, and where the locking plate 52 presses against a peg placed in the pressure distributor.

The invention claimed is:

1. Underwater shackle for heavy loads, comprising a shackle body (10) equipped with respective side plates (12a, 12b) and an upper, intermediate suspension (14) for connection to a lifting strap, a lifting cable, and also a lower locking bolt (20) for connection to the load, the locking bolt (20) is movable arranged in a hydraulically driven cylinder arrangement (30), where the cylinder arrangement (30) is placed adjoining one of the side plates (12a) and where the cylinder arrangement (30) is arranged to be pressurised by a pressure medium to move the locking, bolt (20) between a withdrawn position in the cylinder arrangement (30) and a locking position in the shackle body (10), the cylinder arrangement (30) comprises an inner cylinder boring (32), where a piston part (22) of the locking bolt (20) is arranged for longitudinal movement in the boring, and a first inlet channel (34) for supply of the pressure medium to a first side of the piston part (22), arranged for an outgoing, movement of the locking bolt (20) from the cylinder arrangement (30) and also a second inlet channel (36) for supply of the pressure medium to the other side of the piston part (22), arranged for ingoing movement of the locking bolt (20) into the cylinder arrangement (30), wherein a pressure distributor (40) to receive and distribute the pressure medium is arranged to the cylinder arrangement (30), were the pressure distributor (40) comprises supply channels (44, 46) that run together with said first and second inlet, channels (34,36) in the cylinder arrangement (30).

2. Underwater shackle according to claim 1,
wherein the pressure distributor (40) is arranged next to the cylinder arrangement (30).

3. Underwater shackle according to claim 2, wherein the pressure medium is water.

4. Underwater shackle according to claim 1,
wherein the pressure distributor (40) comprises a number of borings (42a, 2b) arranged to receive a mouthpiece (48) for supply of the pressure medium and that the supply channels (44,46) end up in said borings (42a, 42b).

5. Underwater shackle according to claim 4, wherein the pressure medium is water.

6. Underwater shackle according to claim 1,
wherein said supply channels (44,46) and said first and second inlet channels (34,36) are arranged to function as an inlet and an outlet for the pressure medium dependent on the direction of movement of the locking bolt (20).

7. Underwater shackle according to claim 6, wherein the pressure medium is water.

8. Underwater shackle according to claim 1,
wherein the pressure distributor (40) comprises two borings (42a, 2b), arranged for respective receipt of the mouthpiece (48) and supply of the pressure medium to the first or the second side of the piston pan (22) of the locking bolt (20).

9. Underwater shackle according to claim 8, wherein the pressure medium is water.

10. Underwater shackle according to claim 1,
wherein the cylinder arrangement (30) comprises a spring-loaded locking peg (50) arranged to securely lock the locking bolt (20) when it is in the locking position in the shackle body (10).

11. Underwater shackle according to claim 10, wherein the locking peg (50) is coupled to, or integrated with, a locking plate (52) which is movable arranged in the pressure distributor (40), and where the mouthpiece (48) is arranged to trigger movement of the locking plate (52).

12. Underwater shackle according to claim 11,
wherein the locking plate (52) comprises respective openings (54) that lie in associated borings (42a, 42b) in the pressure distributor (40) and that a nose (48a) of the mouthpiece (48) is arranged to be inserted into or taken out of said openings (54) for raising and lowering, respectively, of the locking plate (52).

13. Underwater shackle according to claim 12, wherein the pressure medium is water.

14. Underwater shackle according to claim 11, wherein the pressure medium is water.

15. Underwater shackle according to claim 10, wherein the pressure medium is water.

16. Underwater shackle according to claim 1, wherein the cylinder arrangement (30) comprises a marker (60) to show whether the locking bolt (20) is in a withdrawn position in the cylinder arrangement (30) or in a locking position in the shackle body (10), and that the pressure distributor (40) comprises a marker (62) to show whether the locking peg (50) is in the locking position in the boring (32) of the cylinder arrangement or in a extracted position.

17. Underwater shackle according to claim 16, wherein the pressure medium is water.

18. Underwater shackle according to claim 1, wherein the pressure medium is water.

19. Underwater shackle according to claim 18,
wherein the pressure medium is supplied from an external, high pressure source.

* * * * *